(12) United States Patent
Dutta et al.

(10) Patent No.: US 12,452,007 B2
(45) Date of Patent: Oct. 21, 2025

(54) SIDELINK FEEDBACK FOR MULTIPLE TRANSMIT-RECEIVE POINTS

(71) Applicant: QUALCOMM Incorporated, San Diego, CA (US)

(72) Inventors: Sourjya Dutta, San Diego, CA (US); Kapil Gulati, Belle Mead, NJ (US); Junyi Li, Fairless Hills, PA (US); Shuanshuan Wu, San Diego, CA (US); Hui Guo, Beijing (CN); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/252,137

(22) PCT Filed: Jan. 12, 2021

(86) PCT No.: PCT/CN2021/071182
§ 371 (c)(1),
(2) Date: May 8, 2023

(87) PCT Pub. No.: WO2022/150942
PCT Pub. Date: Jul. 21, 2022

(65) Prior Publication Data
US 2023/0403109 A1    Dec. 14, 2023

(51) Int. Cl.
*H04L 5/00*    (2006.01)
(52) U.S. Cl.
CPC .......... *H04L 5/0023* (2013.01); *H04L 5/0053* (2013.01)

(58) Field of Classification Search
CPC ... H04L 5/0023; H04L 5/0053; H04L 1/1854; H04L 5/0055; H04L 1/1812;
(Continued)

(56) References Cited

U.S. PATENT DOCUMENTS 10,750,489 B2    8/2020    Li et al.
11,483,845 B2 *  10/2022   Gordaychik .......... H04W 72/23
(Continued)

FOREIGN PATENT DOCUMENTS

CN    110311762 A    10/2019
WO    2018200748 A1  11/2018
(Continued)

OTHER PUBLICATIONS

Supplementary European Search Report—EP21918161—Search Authority—The Hague—Jun. 12, 2024.
(Continued)

*Primary Examiner* — Chandrahas B Patel
(74) *Attorney, Agent, or Firm* — Harrity & Harrity, LLP

(57) ABSTRACT

Various aspects of the present disclosure generally relate to wireless communication. In some aspects, a user equipment (UE) may receive a plurality of sidelink transmissions associated with a spatial division multiplexing (SDM) configuration. The UE may fail to decode at least one sidelink transmission of the plurality of sidelink transmissions. The UE may transmit feedback indicating the failure to decode the at least one sidelink transmission, wherein the feedback includes an indication of at least one layer of the SDM configuration associated with the at least one sidelink transmission. Numerous other aspects are described.

30 Claims, 11 Drawing Sheets

(58) Field of Classification Search
CPC ... H04L 1/1861; H04L 1/1896; H04L 1/0026; H04L 5/0094
See application file for complete search history.

(56) References Cited

U.S. PATENT DOCUMENTS

| | | | |
|---|---|---|---|
| 2020/0077346 A1 | 3/2020 | Kwak et al. | |
| 2020/0145799 A1 | 5/2020 | Baghel et al. | |
| 2020/0337047 A1 | 10/2020 | Abedini et al. | |
| 2022/0386319 A1* | 12/2022 | Ying | H04B 7/0695 |

FOREIGN PATENT DOCUMENTS

| | | |
|---|---|---|
| WO | 2020033089 A1 | 2/2020 |
| WO | 2020033704 A1 | 2/2020 |
| WO | 2020143661 A1 | 7/2020 |
| WO | 2020197316 A1 | 10/2020 |
| WO | 2020221348 A1 | 11/2020 |

OTHER PUBLICATIONS

International Search Report and Written Opinion—PCT/CN2021/071182—ISA/EPO—Oct. 13, 2021.

\* cited by examiner

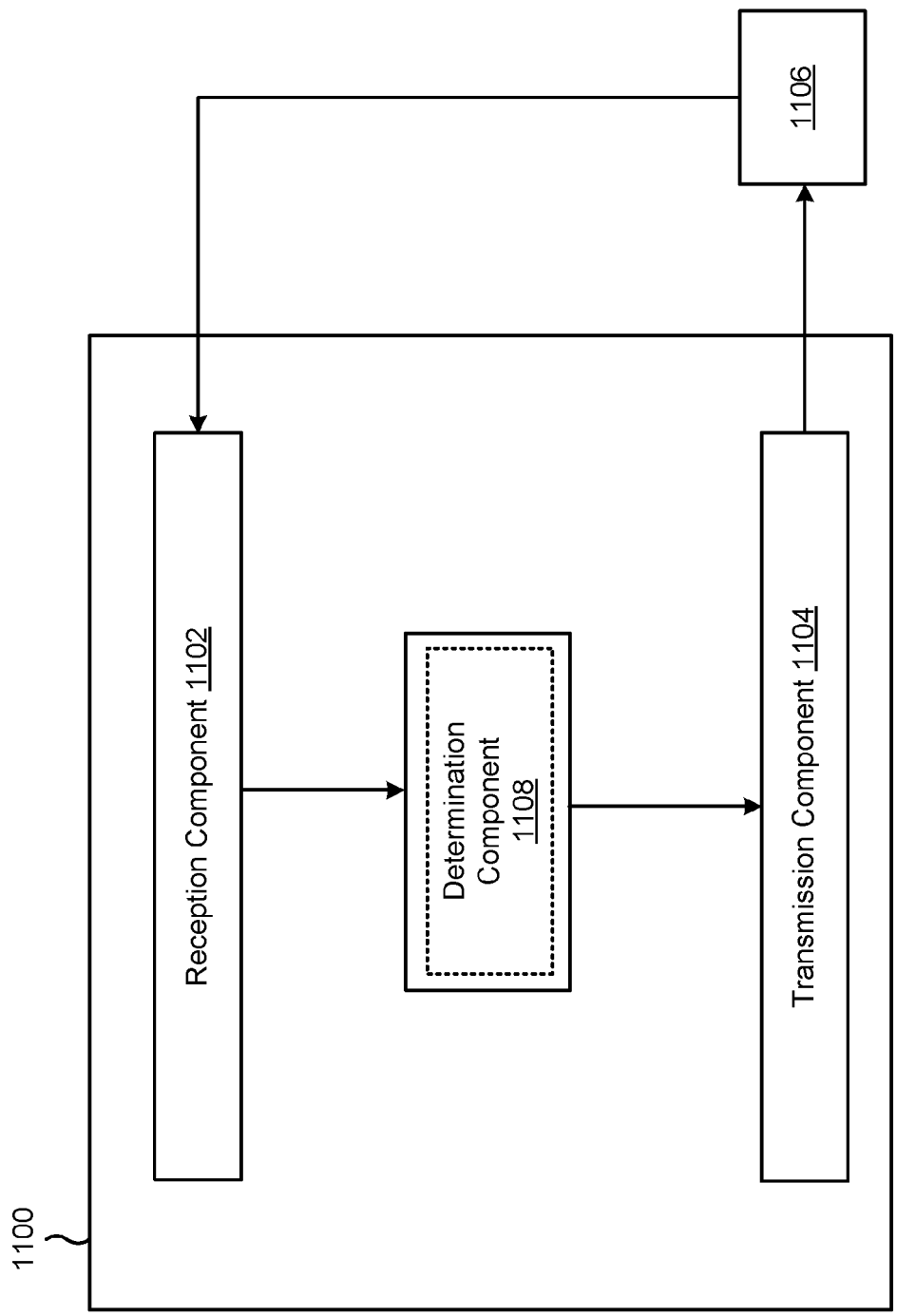

US 12,452,007 B2

SIDELINK FEEDBACK FOR MULTIPLE TRANSMIT-RECEIVE POINTS

CROSS-REFERENCE TO RELATED APPLICATION

This application is a 371 national stage of Patent Cooperation Treaty (PCT) Application No. PCT/CN2021/071182, filed on Jan. 12, 2021, entitled "SIDELINK FEEDBACK FOR MULTIPLE TRANSMIT-RECEIVE POINTS," which is hereby expressly incorporated by reference herein.

FIELD OF THE DISCLOSURE

Aspects of the present disclosure generally relate to wireless communication and to techniques and apparatuses for sidelink feedback for multiple transmit-receive points (TRPS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit-receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a plurality of sidelink transmissions associated with a spatial division multiplexing (SDM) configuration indicating how the plurality of sidelink transmissions are to be spatially multiplexed; failing to decode at least one sidelink transmission of the plurality of sidelink transmissions; and transmitting feedback indicating the failure to decode the at least one sidelink transmission, wherein the feedback includes an indication of at least one layer of the SDM configuration associated with the at least one sidelink transmission.

In some aspects, a method of wireless communication performed by a first UE includes transmitting, to a second UE, a plurality of sidelink transmissions associated with an SDM configuration indicating how the plurality of sidelink transmissions are to be spatially multiplexed; receiving feedback indicating a failure to decode at least one sidelink transmission of the plurality of sidelink transmissions, wherein the feedback includes an indication of at least one layer of the SDM configuration associated with the at least one sidelink transmission; and selectively retransmitting the at least one sidelink transmission based at least in part on the feedback.

In some aspects, a UE for wireless communication includes a memory and one or more processors operatively coupled to the memory, the memory and the one or more processors configured to: receive a plurality of sidelink transmissions associated with an SDM configuration indicating how the plurality of sidelink transmissions are to be spatially multiplexed; fail to decode at least one sidelink transmission of the plurality of sidelink transmissions; and transmit feedback indicating the failure to decode the at least one sidelink transmission, wherein the feedback includes an indication of at least one layer of the SDM configuration associated with the at least one sidelink transmission.

In some aspects, a first UE for wireless communication includes a memory and one or more processors operatively coupled to the memory, the memory and the one or more processors configured to: transmit, to a second UE, a plurality of sidelink transmissions associated with an SDM configuration indicating how the plurality of sidelink transmissions are to be spatially multiplexed; receive feedback indicating a failure to decode at least one sidelink transmission of the plurality of sidelink transmissions, wherein the feedback includes an indication of at least one layer of the SDM configuration associated with the at least one sidelink transmission; and selectively retransmit the at least one sidelink transmission based at least in part on the feedback.

In some aspects, a non-transitory computer-readable medium storing a set of instructions for wireless communication includes one or more instructions that, when executed by one or more processors of a UE, cause the UE to: receive a plurality of sidelink transmissions associated with an SDM configuration indicating how the plurality of sidelink transmissions are to be spatially multiplexed; fail to decode at least one sidelink transmission of the plurality of sidelink transmissions; and transmit feedback indicating the failure to decode the at least one sidelink transmission, wherein the feedback includes an indication of at least one layer of the SDM configuration associated with the at least one sidelink transmission.

In some aspects, a non-transitory computer-readable medium storing a set of instructions for wireless communication includes one or more instructions that, when executed by one or more processors of a first UE, cause the UE to: transmit, to a second UE, a plurality of sidelink transmissions associated with an SDM configuration indicating how the plurality of sidelink transmissions are to be spatially multiplexed; receive feedback indicating a failure to decode at least one sidelink transmission of the plurality of sidelink transmissions, wherein the feedback includes an indication of at least one layer of the SDM configuration associated with the at least one sidelink transmission; and selectively retransmit the at least one sidelink transmission based at least in part on the feedback.

In some aspects, an apparatus for wireless communication includes means for receiving a plurality of sidelink transmissions associated with an SDM configuration indicating how the plurality of sidelink transmissions are to be spatially multiplexed; means for failing to decode at least one sidelink transmission of the plurality of sidelink transmissions; and means for transmitting feedback indicating the failure to decode the at least one sidelink transmission, wherein the feedback includes an indication of at least one layer of the SDM configuration associated with the at least one sidelink transmission.

In some aspects, an apparatus for wireless communication includes means for transmitting, to a UE, a plurality of sidelink transmissions associated with an SDM configuration indicating how the plurality of sidelink transmissions are to be spatially multiplexed; means for receiving feedback indicating a failure to decode at least one sidelink transmission of the plurality of sidelink transmissions, wherein the feedback includes an indication of at least one layer of the SDM configuration associated with the at least one sidelink transmission; and means for selectively retransmitting the at least one sidelink transmission based at least in part on the feedback.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 10 and 11 are block diagrams of example apparatuses for wireless communication, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
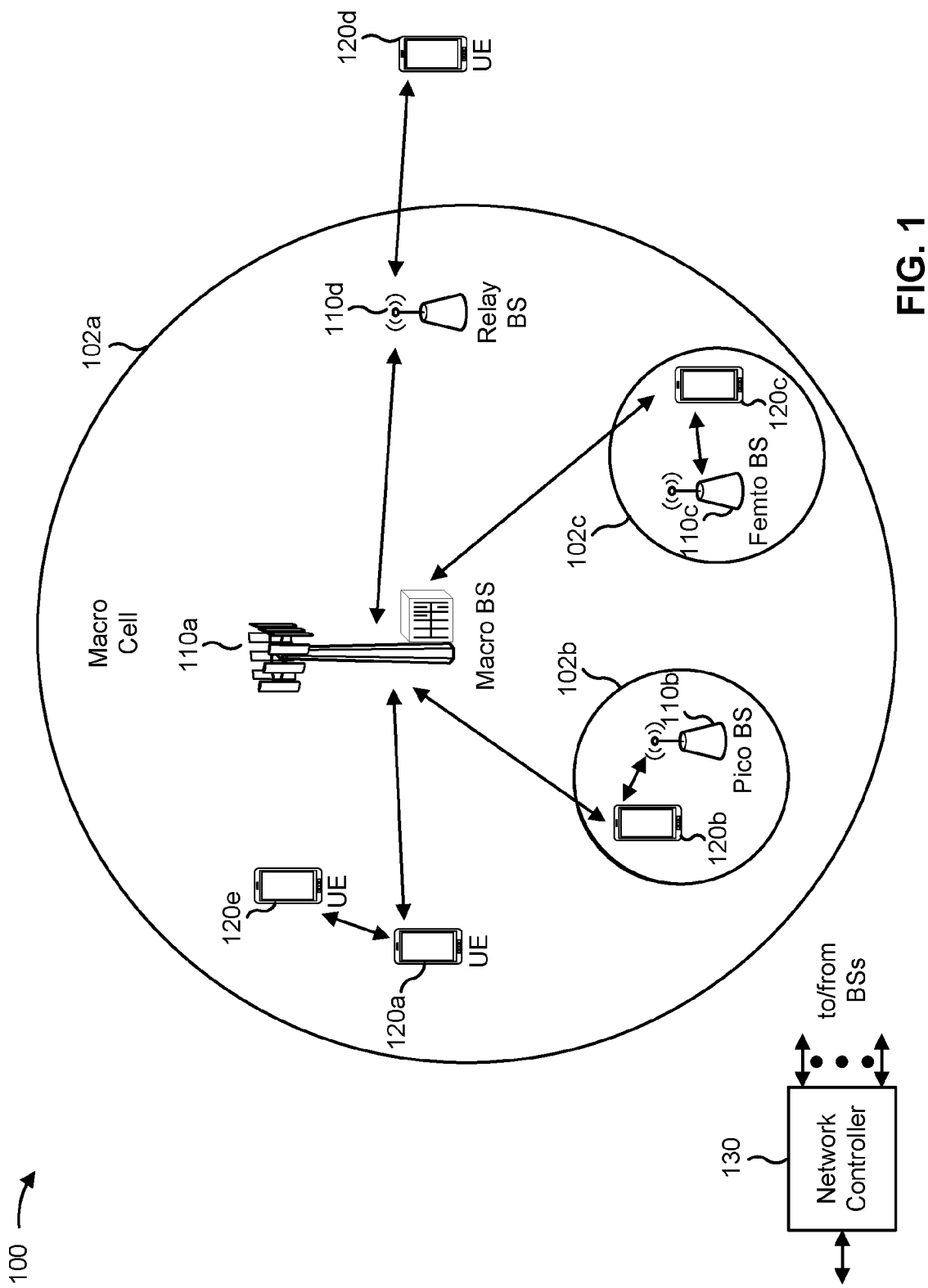
FIG. 1 is a diagram illustrating an example of a wireless network.

FIG. 1 is a diagram illustrating an example of a wireless network 100. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit-receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
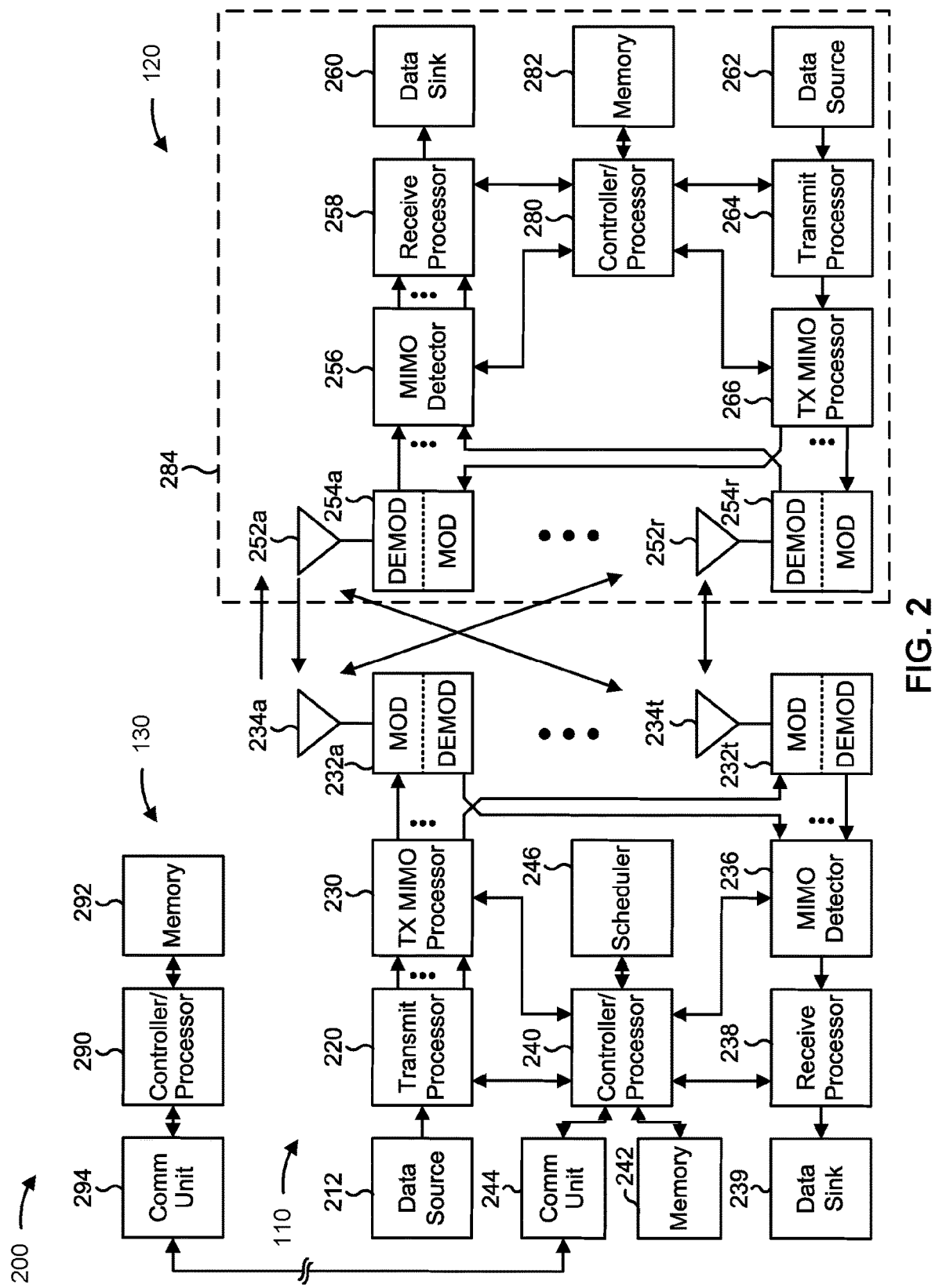
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include a communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-9.

Controller/processor 240 of base station 110, controller/processor 280 of UE 120, and/or any other component(s) of FIG. 2 may perform one or more techniques associated with sidelink feedback for multiple transmit-receive points (TRPs), as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE 120 includes means for receiving a plurality of sidelink transmissions associated with a spatial division multiplexing (SDM) configuration indicating how the plurality of sidelink transmissions are to be spatially multiplexed; means for failing to decode at least one sidelink transmission of the plurality of sidelink transmissions; and/or means for transmitting feedback indicating the failure to decode the at least one sidelink transmission, wherein the feedback includes an indication of at least one layer of the SDM configuration associated with the at least one sidelink transmission. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for determining whether to provide feedback regarding each sidelink transmission of the plurality of sidelink transmissions based at least in part on whether each sidelink transmission is within a threshold range and whether feedback is enabled for each sidelink transmission.

In some aspects, the UE 120 includes means for determining to provide feedback associated with the plurality of sidelink transmissions based at least in part on at least one of: a cast type of the plurality of sidelink transmissions, a zone identifier of the plurality of sidelink transmissions, a range requirement of the plurality of sidelink transmissions, or a determination that the plurality of sidelink transmissions are SDM transmissions of a single set of packets.

In some aspects, the UE 120 includes means for transmitting, to a second UE, a plurality of sidelink transmissions associated with an SDM configuration indicating how the plurality of sidelink transmissions are to be spatially multiplexed; means for receiving feedback indicating a failure to decode at least one sidelink transmission of the plurality of sidelink transmissions, wherein the feedback includes an indication of at least one layer of the SDM configuration associated with the at least one sidelink transmission; and/or means for selectively retransmitting the at least one sidelink transmission based at least in part on the feedback. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for identifying the at least one layer based at least in part on a set of resource elements (REs) on which the indication is transmitted; means for identifying a communication to be retransmitted based at least in part on the at least one layer; and/or means for retransmitting the communication via the at least one layer.

In some aspects, the UE 120 includes means for retransmitting a proper subset of the plurality of sidelink transmissions based at least in part on the feedback including the indication of the at least one layer.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
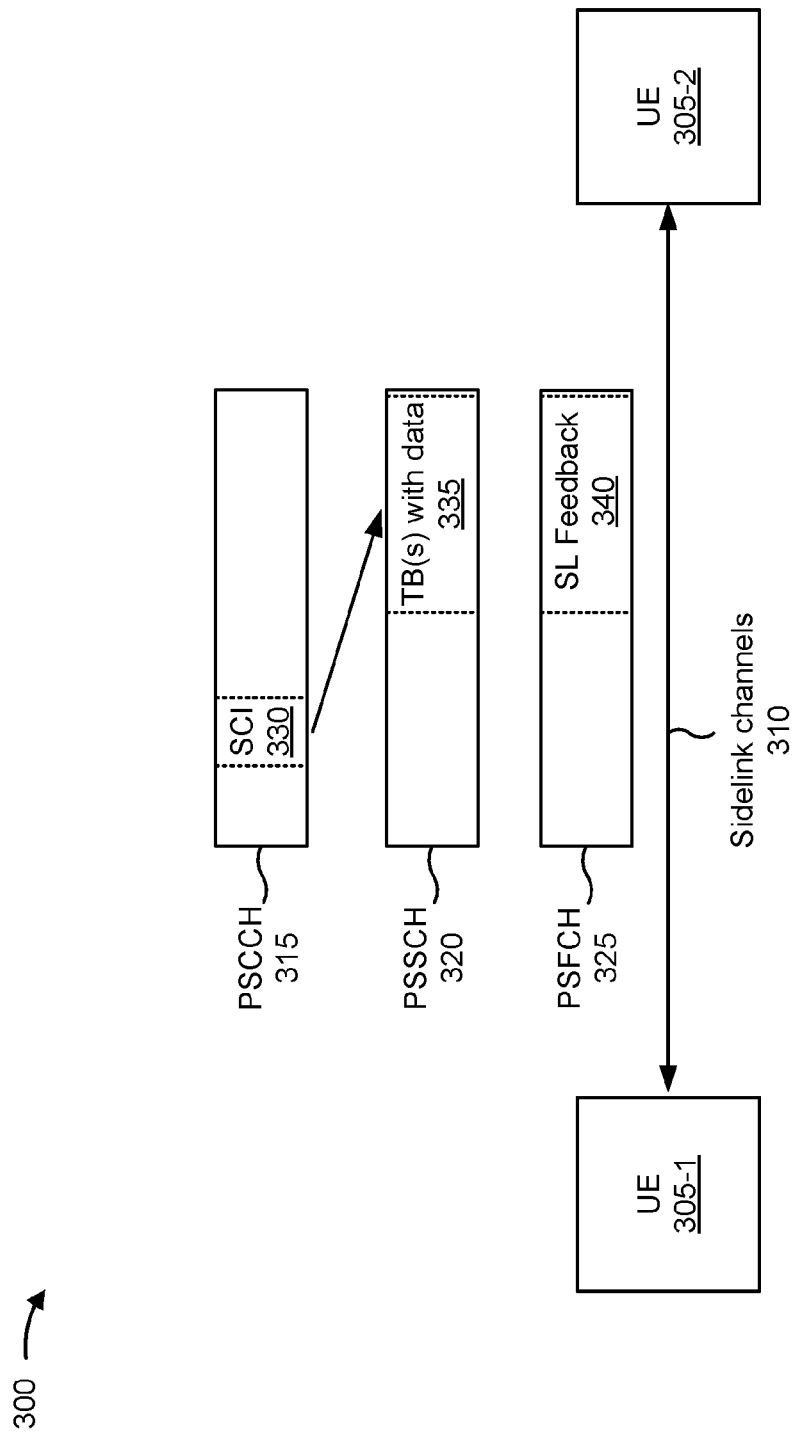
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, one or more of the UEs 305 may be a multi-TRP UE, described in more detail in connection with FIG. 5. In some aspects, the one or more sidelink channels 310 may use a ProSe Sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs. In some aspects, a sidelink channel 310 may be transmitted using a spatial division multiplexing (SDM) configuration, which is described in more detail elsewhere herein.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PS SCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
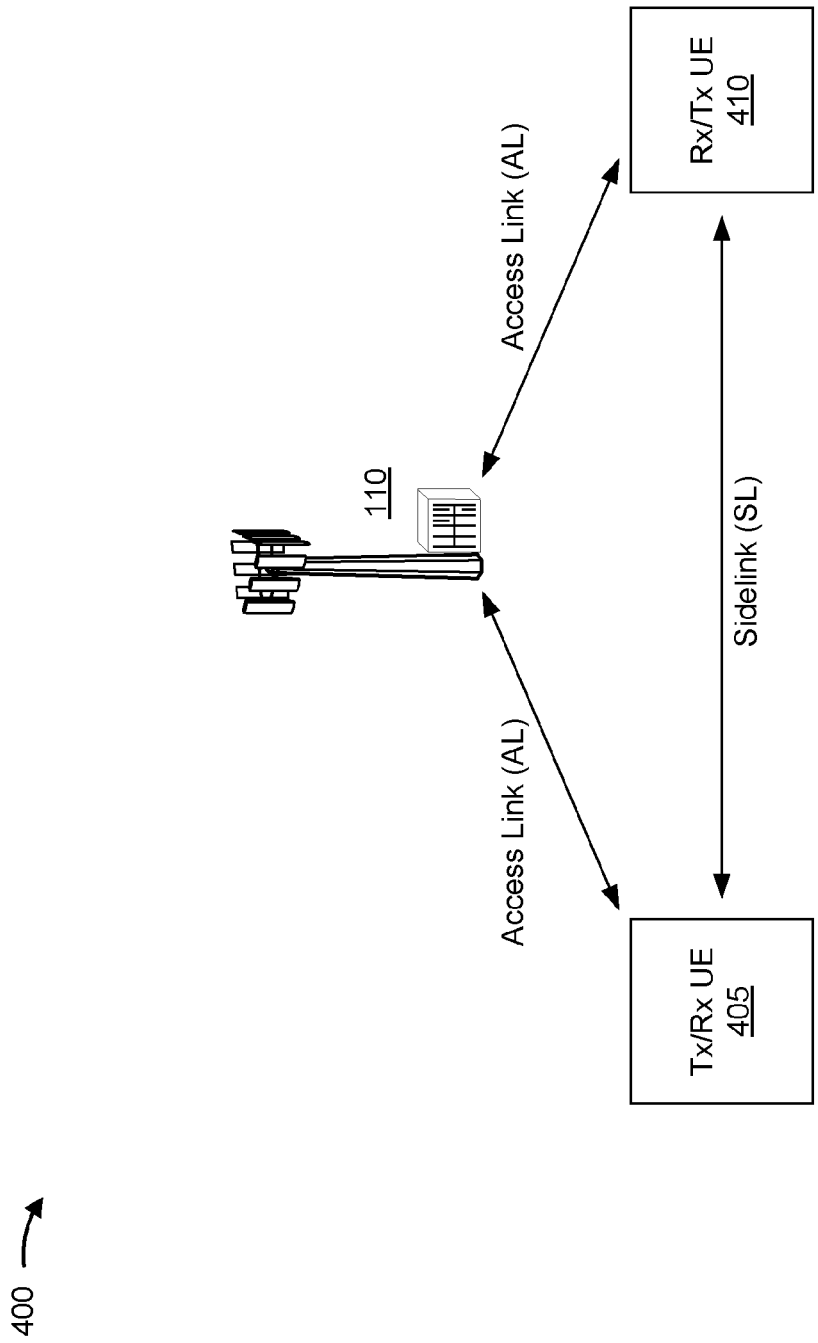
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
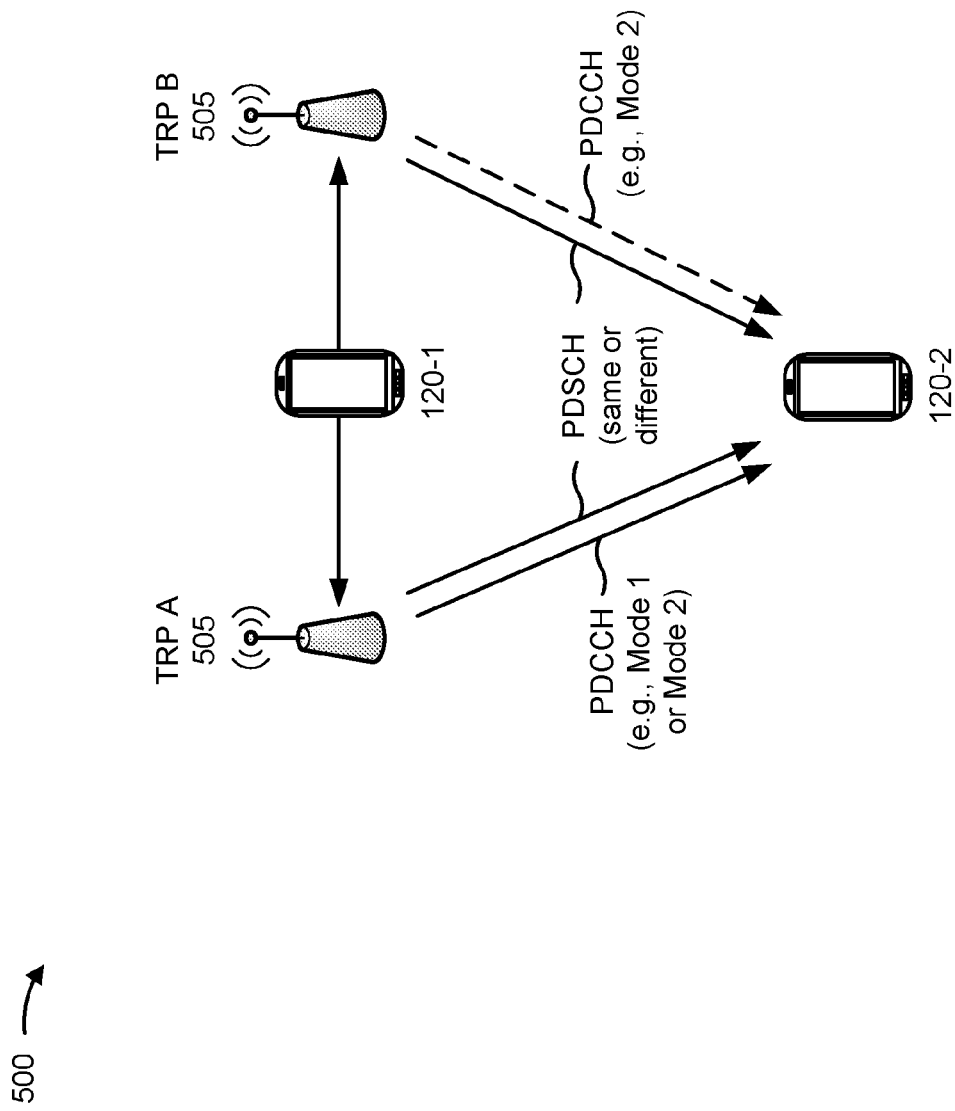
FIG. 5 is a diagram illustrating an example of multiple transmit-receive point (multi-TRP) communication, in accordance with various aspects of the present disclosure.

FIG. 5 is a diagram illustrating an example 500 of multi-TRP communication (sometimes referred to as multi-panel communication), in accordance with various aspects of the present disclosure. As shown in FIG. 5, multiple TRPs 505 associated with a UE 120-1 may communicate with the same UE 120-2.

A TRP 505 may be a distributed unit (DU) of a UE 120-1, such as an antenna panel, an antenna, an antenna sub-panel, an antenna array, or the like. In some aspects, TRPs 505 may have separate antennas and/or separate functional components, and a common control unit associated with the UE 120-1. In some aspects, multiple TRPs 505 may transmit communications (e.g., the same communication or different communications) in the same transmission time interval (TTI) (e.g., a slot, a mini-slot, a subframe, a symbol, and/or the like) or different TTIs using different quasi-colocation (QCL) relationships (e.g., different spatial parameters, different transmission configuration indicator (TCI) states, different precoding parameters, different beamforming parameters, and/or the like). In some aspects, a TCI state may be used to indicate one or more QCL relationships. For example, a TCI state may indicate a QCL relationship between a given channel (e.g., a PSCCH, a PSSCH, a PSFCH, or the like) and a source signal. The TCI state may indicate that a parameter (e.g., Doppler shift, Doppler spread, a spatial parameter such as a spatial reception parameter, average delay, delay spread, or the like) to be used for the given channel should be derived from the source signal. A TRP 505 may be configured to individually (e.g., using dynamic selection) or jointly (e.g., using joint transmission with one or more other TRPs 505) serve traffic to a UE 120-2. Each TRP 505 may include a respective radio frequency (RF) module with a shared hardware and/or software controller. In some aspects, a TRP 505 may be capable of directional transmission, such as based at least in part on a QCL relationship or a spatial parameter described above.

In some aspects, multiple TRPs 505 of a UE 120-1 may be implemented in association with a vehicle. For example, a vehicle-based UE may have two or more TRPs 505. In some aspects, a car may have front and rear antenna panels (e.g., TRPs 505). In some aspects, a vehicle may have many TRPs 505. For example, a larger vehicle, such as a truck or a tractor trailer, may have several TRPs 505. The TRPs 505 of a vehicle may be spatially separated from each other. As just two examples, the front and rear TRPs 505 on a car may be separated from each other by approximately 3 to 4 meters, whereas a tractor trailer may have a separation between TRPs 505 of approximately 20 meters. This displacement between TRPs 505 may mean that each TRP 505 may view the channel (e.g., the propagation path and/or propagation characteristics of signals received or transmitted by each TRP 505) differently from other TRPs 505, such as due to differences in distance, a line-of-sight channel versus a non-line-of-sight channel, blockages, or the like.

The multiple TRPs 505 (shown in FIG. 5 as TRP A and TRP B) may communicate with the same UE 120-2 in a coordinated manner (e.g., using coordinated multipoint transmissions and/or the like) to improve reliability, increase throughput, and/or the like. The TRPs 505 may coordinate such communications via an interface between the TRPs 505, such as via a UE 120-1 managing the TRPs 505. The different TRPs 505 may communicate with the UE 120-2 using different QCL relationships (e.g., different TCI states), different demodulation reference signal (DMRS) ports, different layers (e.g., of a multi-layer communication), and/or the like.

In some aspects, TRPs 505 may transmit a sidelink communication using an SDM configuration. An SDM configuration may indicate how communications are to be multiplexed on different spatial layers (referred to hereinafter as "layers"). Communications transmitted using an SDM configuration may be associated with a common control signal, such as a common PSCCH carrying sidelink control information (SCI). The SCI may carry information regarding the SDM configuration, such as information indicating how a plurality of sidelink transmissions are multiplexed, how individual layers are to be decoded, and so on. For example, different layers may have different hybrid automatic repeat request (HARQ) process identifiers, orthogonal demodulation reference signal (DMRS) patterns, or the like, such that communications on the different layers can be differentiated from each other at the UE 120-2. A plurality of sidelink transmissions transmitted using an SDM configuration may be transmitted on at least partially overlapping time and frequency (time-frequency or time/frequency) resources.

As indicated above, FIG. 5 is provided as an example. Other examples may differ from what is described with respect to FIG. 5.

A UE (e.g., UE 120, UE 305, UE 405/410) may transmit feedback regarding a sidelink transmission via a PSFCH. For example, the UE may determine a result of decoding a communication (e.g., a PSCCH or a PSSCH), and may provide HARQ feedback (e.g., an acknowledgment (ACK) or a negative ACK (HACK)) regarding the communication via a PSFCH. A PSFCH may be associated with a PSFCH resource. Feedback may be mapped to a PSFCH resource based at least in part on a time-frequency resource that a communication associated with the feedback occupies and a source identifier of the communication. For example, a recipient UE (e.g., UE 120-2) may be configured (e.g., preconfigured, configured via radio resource control signaling, or the like) with a rule indicating how feedback regarding a communication is to be mapped to a communication, and the rule may be based at least in part on a time-frequency resource on which the communication is received and a source identifier (e.g., information that identifies a UE that transmitted the communication).

Some sidelink transmissions may be associated with an SDM configuration. As mentioned above, an SDM configuration may indicate how a plurality of sidelink transmissions, associated with at least partially overlapping time-frequency resource allocations, are to be spatially multiplexed on respective layers for transmission to a recipient UE. However, if feedback resources for a plurality of sidelink transmissions are determined based at least in part on the time-frequency resource allocation of the plurality of sidelink transmissions, and if the plurality of sidelink transmissions overlap each other, then feedback for multiple sidelink transmissions may be mapped to the same feedback resources. This may be particularly problematic for connectionless groupcast and broadcast communications, for which a destination identifier of the communications is not specified and thus cannot be used to distinguish the communications from each other for the purpose of determining feedback resources.

If a transmitter (e.g., UE 120-1) cannot distinguish which communication is associated with feedback received on a PSFCH resource, such as because multiple communications are mapped to the PSFCH resource, then the transmitter may use communication resources and processing resources to retransmit each communication associated with the PSFCH resource. Additionally, or alternatively, the transmitter may disregard the feedback, thus leading to diminished throughput between the transmitter and the receiver. Thus, the reliability and efficiency of sidelink communications are degraded, particularly for multi-TRP UEs performing sidelink communications.

Some techniques and apparatuses described herein provide contention resolution for feedback on a PSFCH resource relating to a plurality of sidelink transmissions. For example, some techniques and apparatuses described herein provide for determination of one or more layers of a communication, including a plurality of sidelink transmissions associated with an SDM configuration, to which the feedback relates. In some aspects, a receiver UE (e.g., UE 120-2) may fail to decode one or more sidelink transmissions of a plurality of sidelink transmissions, and may identify one or more layers corresponding to the one or more sidelink transmissions. The receiver UE may provide feedback indicating the one or more layers. For example, the receiver UE may provide a common NACK relating to all layers of the plurality of sidelink transmissions, and may provide, in association with the common NACK (e.g., in a same PSFCH resource), an indication of the one or more layers. A transmitter UE (e.g., that transmitted at least one of the plurality of sidelink transmissions) may receive the feedback on the PSFCH resource, may identify the one or more layers based at least in part on the indication, and may take appropriate action (e.g., retransmitting the one or more sidelink communications associated with the one or more layers, modifying a transmission configuration or the SDM configuration based at least in part on the feedback, or the like).

By providing feedback indicating one or more layers associated with one or more failed sidelink transmission associated with an SDM configuration, the receiver UE may enable the transmitter UE to identify a subset of layers of an SDM communication which were not received by the receiver UE. Thus, the transmitter UE can retransmit a subset of transmissions of the SDM communication, thereby conserving communication and computing resources associated with indiscriminate retransmission of the SDM communication and improving throughput relative to determining not to retransmit the SDM communication. Additionally, or alternatively, the transmitter UE may adjust a transmission configuration or the SDM configuration based at least in part on the feedback, which may improve reliability and robustness of the SDM communication. Furthermore, the usage of the common NACK and the indication of the one or more layers improves backward compatibility with UEs that are capable only of detecting the common NACK.

Figure 6:
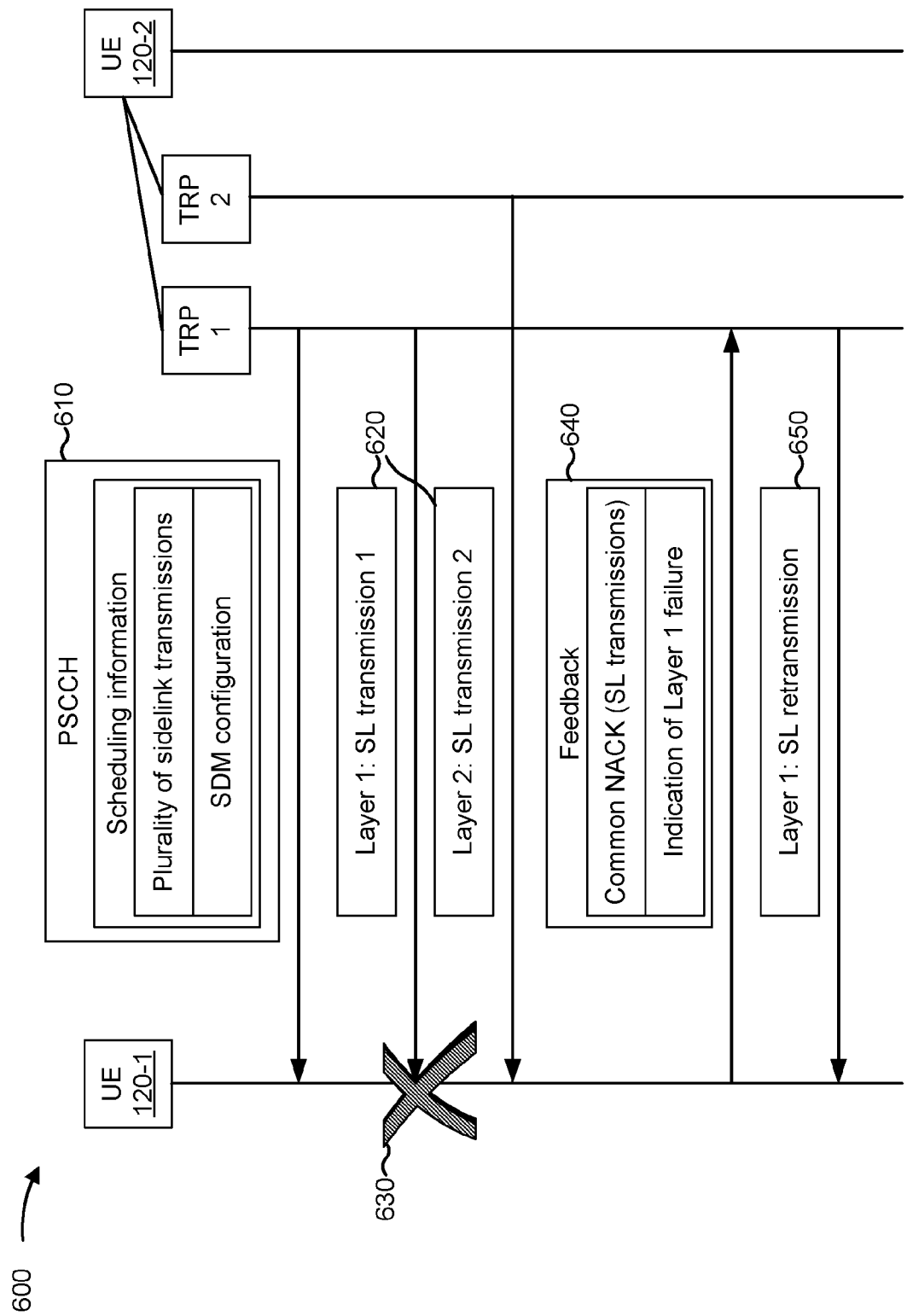
FIG. 6 is a diagram illustrating an example of signaling associated with feedback for a spatially multiplexed plurality of sidelink transmissions, in accordance with various aspects of the present disclosure.

FIG. 6 is a diagram illustrating an example 600 of signaling associated with feedback for a spatially multiplexed plurality of sidelink transmissions, in accordance with various aspects of the present disclosure. As shown, example 600 includes a UE 120-1 and a UE 120-2 (e.g., UE 120, UE 305, UE 405/410). As further shown, UE 120-2 may be associated with a first TRP and a second TRP (e.g., TRPs 505, and shown in FIG. 6 as TRP 1 and TRP 2, respectively).

As shown in FIG. 6, and by reference number 610, the UE 120-1 may receive, from the UE 120-2 (e.g., via the first TRP or the second TRP), control information. For example, the control information may include SCI transmitted via a PSSCH. As further shown, the SCI may carry scheduling information for a plurality of sidelink transmissions. For example, the SCI may indicate a resource allocation (e.g., a time-frequency resource allocation) for the plurality of sidelink transmissions and an SDM configuration for the plurality of sidelink transmissions. In some aspects, the SDM configuration may be included in the indication of the resource allocation. The SDM configuration may indicate a layer (e.g., a spatial layer) to carry each sidelink transmission of the plurality of sidelink transmissions, such as based at least in part on quasi-colocation information (e.g., one or more transmission configuration indicator (TCI) states for the plurality of sidelink transmissions), an identifier associated with a layer, or the like. In some aspects, a communication (e.g., a packet or the like) may be transmitted by the UE 120-2 on multiple layers via multiple sidelink transmissions, thus providing spatial diversity for the communication.

In some aspects, the PSCCH (e.g., and/or the SCI) may be a common control channel for each sidelink transmission of the plurality of sidelink transmissions. For example, the PSSCH may schedule each sidelink transmission of the plurality of sidelink transmissions. In some aspects, the UE 120 may determine that the scheduling information schedules transmission of a plurality of sidelink transmissions associated with an SDM configuration. In some aspects, the SCI may include a first part (e.g., SCI-1) and a second part (e.g., SCI-2). In some aspects, the first part may be common to the plurality of sidelink transmissions and the second part may be specific to each sidelink transmission of the plurality of sidelink transmissions. In some aspects, the first part and the second part may be common to the plurality of sidelink transmissions.

In some aspects, the plurality of sidelink transmissions may be of a cast type that is not associated with a destination identifier. For example, the plurality of sidelink transmissions may be groupcast transmissions, broadcast transmissions, or the like. A cast type that is not associated with a destination identifier is a cast type for which a transmission using the cast type does not include a destination identifier. For example, unicast is a cast type that is associated with a destination identifier, whereas groupcast and broadcast are cast types that are not associated with destination identifiers.

In some aspects, the UE 120-1 may determine whether feedback is to be provided for a particular layer (or a particular sidelink transmission) scheduled by the PSSCH. For example, the UE 120-1 may identify one or more layers, of a plurality of layers associated with the plurality of sidelink transmissions) to be included in a group (referred to herein as a group of interest or a range of interest) for which the UE 120-1 is to provide feedback. In some aspects, the UE 120-1 may identify the one or more layers based at least in part on a cast type (e.g., unicast, groupcast, multicast, or the like). For example, the UE 120-1 may determine to provide feedback for layers associated with sidelink transmissions of one or more particular cast types. In some aspects, the UE 120-1 may identify the one or more layers based at least in part on a zone identifier or other location information associated with the one or more layers. For example, the UE 120-1 may determine to provide feedback for layers associated with sidelink transmissions associated with a particular zone identifier or a communication range requirement inferred from the zone identifier (e.g., a same zone identifier as the UE 120-1). In some aspects, the UE 120-1 may identify the one or more layers based at least in part on a range requirement associated with the plurality of sidelink transmissions. For example, the UE 120-1 may determine to provide feedback for layers associated with sidelink transmissions for which the UE 120-1 is within a threshold range identified by a range requirement. In some aspects, the UE 120-1 may identify the one or more layers based at least in part on an indication of whether to provide feedback (e.g., an indication of whether feedback is enabled). For example, the SCI (e.g., a second part of the SCI such as SCI-2) may indicate whether feedback is to be provided for a corresponding sidelink transmission or layer.

In some aspects, the UE 120 may determine whether feedback is to be provided for a given sidelink transmission based at least in part on a required range, a reference signal received power (RSRP) of a DMRS of the sidelink transmission, an indication of whether feedback is enabled for a given layer, and/or the like. For example, the UE 120-1 may perform this determination based at least in part on the below table, where "Low" represents a DMRS RSRP that fails to satisfy a threshold and "High" represents a DMRS RSRP that satisfies the threshold:

|  | Data DMRS RSRP | Send feedback? |
|---|---|---|
| Out of range and feedback disabled | — | No |
| In range and feedback enabled | Low | No |
| In range and feedback enabled | High | Yes |

In some aspects, the UE 120-1 may determine whether to provide feedback for each sidelink transmission (e.g., each packet) that is transmitted on a layer included in the group of interest, described above. For example, the UE 120-1 may use the table shown above, with regard to each sidelink transmission received on a layer included in the group of interest, to determine whether feedback should be provided for each sidelink transmission.

As shown by reference number 620, the UE 120-2 may transmit a plurality of sidelink transmissions associated with the SDM configuration indicated by the control information. For example, the first TRP of the UE 120-2 may transmit a first sidelink transmission (SL transmission 1) on a first layer (Layer 1) and the second TRP of the UE 120-2 may transmit a second sidelink transmission (SL transmission 2) on a second layer (Layer 2). In some aspects, the first sidelink transmission and the second sidelink transmission may carry respective communications (e.g., respective packets or groups of packets). The first sidelink transmissions and the second sidelink transmission may be transmitted via respective resource allocations indicated by the PSCCH shown by reference number 610.

As shown by reference number 630, the UE 120-1 may fail to receive one or more sidelink transmissions of the plurality of sidelink transmissions. For example, the UE 120-1 may fail to decode the one or more sidelink transmissions. In example 600, the UE 120-1 fails to receive the first sidelink communication on the first layer. In some aspects, the UE 120-1 may fail to receive a subset of the plurality of sidelink transmissions. In some aspects, the UE 120-1 may fail to receive all of the plurality of sidelink transmissions.

As shown by reference number 640, the UE 120-1 may transmit, and the UE 120-2 may receive, feedback regarding the plurality of sidelink transmissions. For example, the UE 120-1 may determine that the UE 120-1 has failed to receive one or more sidelink transmissions on one or more layers. The UE 120-1 may transmit feedback via a PSFCH resource indicating the failure to decode the one or more sidelink transmissions. For example, the UE 120-1 may receive information configuring a periodicity (in slots) for PSFCH transmission occasion resources (referred to as PSFCH resources herein). If the periodicity indicates that a slot contains a PSFCH resource, then the UE 120-1 may transmit feedback on a PSFCH resource in the slot. "PSFCH resource" is used interchangeably with "PSFCH occasion" herein.

As shown, the feedback may include a common NACK. A common NACK (which may be referred to as a primary NACK or a first NACK) is an indication that at least one sidelink transmission associated with the PSFCH resource was not received by the UE 120-1. If the UE 120-1 had successfully received all of the plurality of sidelink transmissions associated with the PSFCH resource, then the UE 120-1 may transmit a common ACK, which indicates that the UE 120-1 successfully received all of the plurality of sidelink transmission associated with the PSFCH resource. In some aspects, the UE 120-1 may identify a PSFCH resource for the common NACK. In some aspects, the common NACK may be located at a resource (e.g., in a PSFCH resource) defined by a time/frequency resource associated with the plurality of sidelink transmissions. In some aspects, the UE 120-1 may identify the PSFCH resource for the common NACK based at least in part on a time-frequency resource associated with the plurality of sidelink communications, a source identifier of the plurality of sidelink transmissions (e.g., a source identifier associated with the UE 120-2), or the like. As another example, the UE 120-1 may identify the PSFCH resource based at least in part on a periodicity associated with the PSFCH resource (e.g., may transmit the feedback in a next slot after the plurality of sidelink transmissions that includes a PSFCH resource).

As further shown, the feedback may include an indication (which may be referred to as one or more secondary NACKs) of at least one layer of the SDM configuration associated with at least one sidelink transmission which the UE 120-1 failed to decode. In example 600, the indication may indicate the first layer. In some aspects, the indication may be transmitted on a number of resource elements (REs) equal to a number of layers on which the at least one sidelink transmission failed. The indication may include, on each RE of the number of REs, information indicating whether the UE 120-1 failed to receive a sidelink transmission on a corresponding layer. For example, such information may be a binary indication (e.g., an ACK/NACK), a sequence of binary indications on multiple REs, or the like.

In some aspects, the UE 120-1 may identify a number of REs (e.g., a quantity of REs and/or specific REs) to carry the indication. For example, the number of REs of the PSFCH resource may be represented by $N_{RE}$ and the number of REs that are unused by the PSFCH channel (e.g., the common NACK) or other communications may be represented by $N_0$. The UE 120-1 may select the number of REs from the $N_0$ REs on the PSFCH symbols that are not used by the PSFCH channel. For example, in a system with $N_{RE}$ REs, where the PSFCH channel uses $[0, N_{RE}-N_0-1]$ for the PSFCH, the UE 120-1 may use REs enumerated or selected from $[N_{RE}-N_0, N_{RE}]$ for the indication. The UE 120-1 may select (e.g., enumerate) L REs among the $N_0$ REs, where L is a number of layers included in the group of interest. For example, the indication may be transmitted on a number of REs equal to a number of layers on which the at least one sidelink transmission failed. In some aspects, the UE 120-1 may select the $N_0$ REs from $[0, N_0-1]$. For example, the UE 120-1 may select a starting index i for the indication based at least in part on at least one source identifier associated with the at least one sidelink transmission and based at least in part on the number of layers: $i=\mod(L*S_{ID}, N_0)$, where $S_{ID}$ is the source identifier (i.e. transmitter identifier). In another example, the $N_0$ resources may be split into X blocks, where X is a maximum number of spatial streams or layers supported by the UE 120-1. The UE 120-1 may select the index $$i = \mod\left(S_{ID}, \frac{N_0}{L}\right),$$

for each set of REs. In yet another example, the UE 120-1 may partition the PSFCH resources based at least in part on the number of layers (L) in the group of interest, a time resource associated with the at least one sidelink transmission T (e.g., a relative transmission time interval (TTI)) associated with the plurality of sidelink transmissions, and a frequency resource associated with the at least one sidelink transmission f (e.g., a subchannel or resource block (RB) allocation), then may determine the starting index for the indication as $$i = \text{mod}\left(S_{ID}, \frac{N_0}{L*T*f}\right).$$

The indication may include, on each RE of the number of REs, information indicating whether the UE 120-1 failed to receive a sidelink transmission on a corresponding layer.

As shown by reference number 650, the UE 120-2 may retransmit the one or more sidelink transmissions indicated by the feedback. For example, the UE 120-2 may determine that the UE 120-1 failed to receive the one or more sidelink transmissions on the one or more layers, as indicated by the indication in the feedback. Accordingly, the UE 120-2 may retransmit the one or more sidelink transmissions. In some aspects, the UE 120-2 may modify a transmission configuration for the retransmission of the one or more sidelink transmissions. For example, the UE 120-2 may use more robust modulation or coding, may increase a number of repetitions of the retransmission, may use a different set of layers, or the like.

In some aspects, the UE 120-2 may determine whether feedback is received in the PSFCH resource. For example, the UE 120-2 may determine the PSFCH resource as described above with regard to the UE 120-1. If the UE 120-2 does not detect a common NACK in the PSFCH resource, the UE 120-2 may determine that the plurality of sidelink communications were successfully received by the UE 120-1. If the UE 120-2 detects a common NACK, the UE 120-2 may determine that one or more sidelink transmissions of the plurality of sidelink transmissions were not successfully received by the UE 120-1. If the UE 120-2 detects the common NACK, the UE 120-2 may identify a number of REs (e.g., a quantity of REs and/or specific REs) on which the indication is transmitted, as described above with regard to the UE 120-1. If one or more REs of the number of REs indicates a NACK (e.g., indicates that a sidelink transmission on a corresponding layer of the group of interest was not received), then the UE 120-2 may identify at least one layer based at least in part on the one or more REs on which the indication is transmitted, and may identify one or more communications to be retransmitted based at least in part on the layer or set of layers associated with the NACK. Thus, the UE 120-2 may retransmit communications on one or more layers, which may correspond to a proper subset of (e.g., less than all of) a plurality of sidelink transmissions of the UE 120-2. If the UE 120-2 detects no NACKs in the number of REs on which the indication is to be transmitted, then the UE 120-2 may retransmit all of the plurality of sidelink communications.

It should be noted that the usage of the common NACK and the indication of the one or more layers may enable backward compatibility with legacy UEs. For example, a UE that is incapable of interpreting the indication of the one or more layers may still be capable of interpreting the common NACK, and may thus retransmit the plurality of sidelink transmissions. In another example, such a UE may select a set of sidelink transmissions for retransmission based at least in part on PSFCH signal power measurements (e.g., reference signal received power or the like) on each of the UE's TRPs and, when available, secondary feedback transmitted by other sidelink UEs.

As indicated above, FIG. 6 is provided as an example. Other examples may differ from what is described with regard to FIG. 6.

Figure 7:
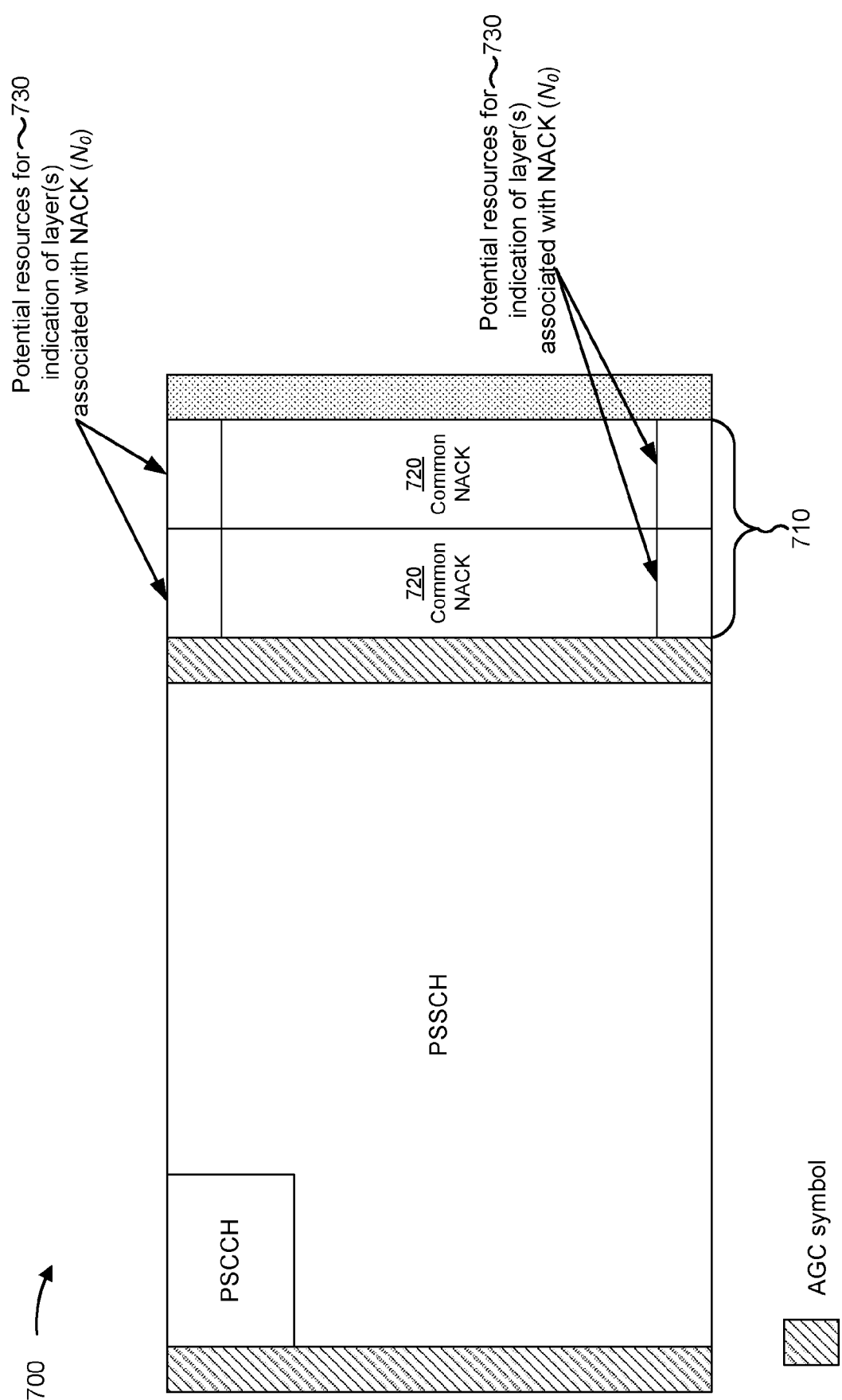
FIG. 7 is a diagram illustrating a structure 700 for feedback regarding a plurality of sidelink transmissions associated with a spatial division multiplexing (SDM) configuration, in accordance with various aspects of the present disclosure.

FIG. 7 is a diagram illustrating a structure 700 for a slot including feedback regarding a plurality of sidelink transmissions associated with an SDM configuration, in accordance with various aspects of the present disclosure. The structure 700 includes a PSCCH, a PSSCH, and a PSFCH resource 710 (as well as automated gain control (AGC) symbols indicated by a diagonal fill and a gap symbol indicated by a dotted fill). Resources used for the common NACK are shown by reference number 720. As shown, a last two symbols of the slot, other than the gap symbol, can be used for PSFCH transmission. Potential resources for the indication of the one or more layers are shown by reference number 730. As shown, the indication can be transmitted in a same PSFCH resource (e.g., a same PSFCH transmission occasion resource) as the common NACK using one or more unused REs that are unused by the common NACK, thus providing backward compatibility and more accurate indication of HARQ feedback for SDM communications in a sidelink network with a multi-TRP transmitter.

As indicated above, FIG. 7 is provided as an example. Other examples may differ from what is described with regard to FIG. 7.

Figure 8:
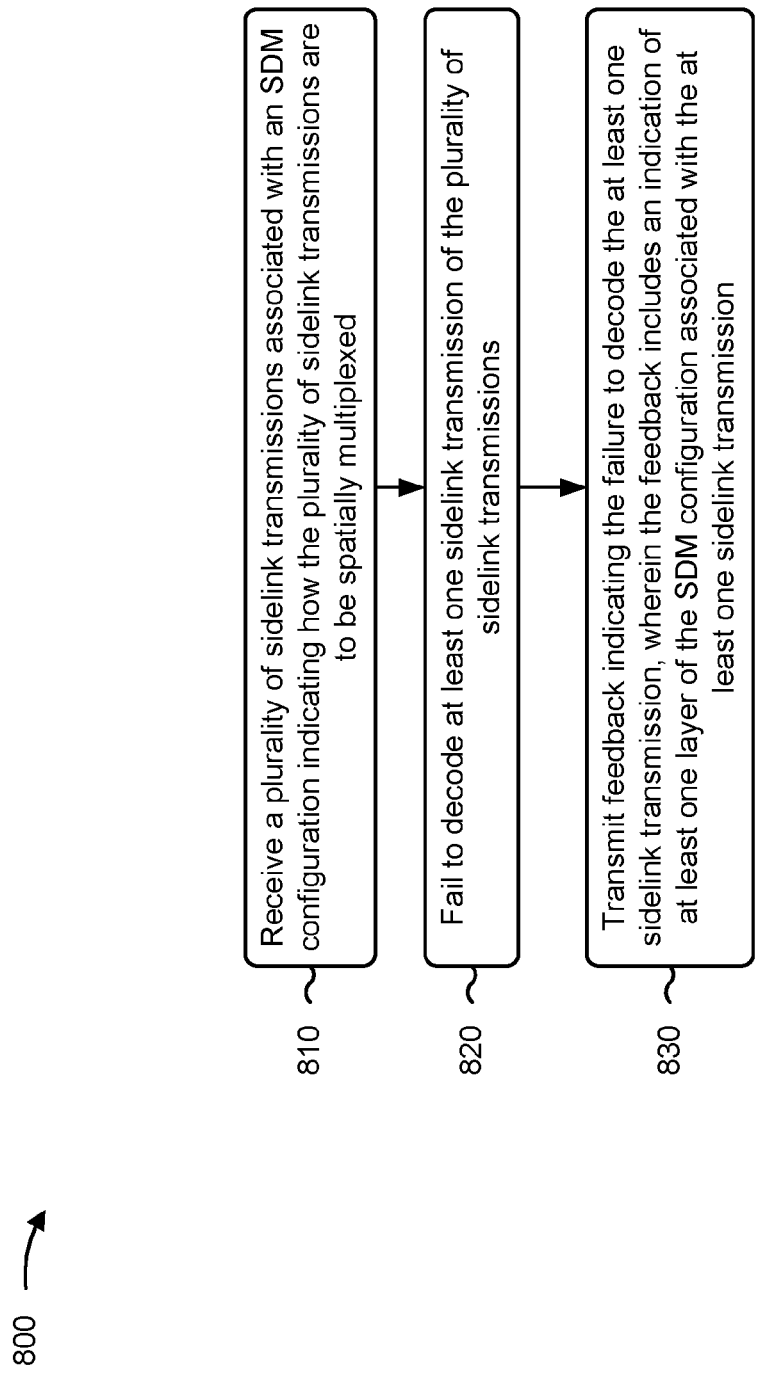
FIGS. 8 and 9 are diagram illustrating example processes performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120) performs operations associated with sidelink feedback for multiple transmit-receive points.

As shown in FIG. 8, in some aspects, process 800 may include receiving a plurality of sidelink transmissions associated with a spatial division multiplexing (SDM) configuration indicating how the plurality of sidelink transmissions are to be spatially multiplexed (block 810). For example, the UE (e.g., using reception component 1002, depicted in FIG. 10) may receive a plurality of sidelink transmissions associated with an SDM configuration indicating how the plurality of sidelink transmissions are to be spatially multiplexed, as described above.

As further shown in FIG. 8, in some aspects, process 800 may include failing to decode at least one sidelink transmission of the plurality of sidelink transmissions (block 820). For example, the UE (e.g., using reception component 1002, depicted in FIG. 10) may fail to decode at least one sidelink transmission of the plurality of sidelink transmissions, as described above.

As further shown in FIG. 8, in some aspects, process 800 may include transmitting feedback indicating the failure to decode the at least one sidelink transmission, wherein the feedback includes an indication of at least one layer of the SDM configuration associated with the at least one sidelink transmission (block 830). For example, the UE (e.g., using transmission component 1004, depicted in FIG. 10) may transmit feedback indicating the failure to decode the at least one sidelink transmission, wherein the feedback includes an indication of at least one layer of the SDM configuration associated with the at least one sidelink transmission, as described above.

Process 800 may include additional aspects, such as any single aspect or any combination of aspects described below and/or in connection with one or more other processes described elsewhere herein.

In a first aspect, the indication is transmitted in a sidelink feedback channel with a common NACK corresponding to the plurality of sidelink transmissions, and the indication is transmitted on a resource element, of the sidelink feedback channel, that is unused by the common NACK.

In a second aspect, alone or in combination with the first aspect, process 800 includes determining whether to provide feedback regarding each sidelink transmission of the plurality of sidelink transmissions based at least in part on whether each sidelink transmission is within a threshold range and whether feedback is enabled for each sidelink transmission.

In a third aspect, alone or in combination with one or more of the first and second aspects, process 800 includes determining to provide feedback associated with the plurality of sidelink transmissions based at least in part on at least one of a cast type of the plurality of sidelink transmissions, a zone identifier of the plurality of sidelink transmissions, a range requirement of the plurality of sidelink transmissions, or a determination that the plurality of sidelink transmissions are SDM transmissions of a single set of packets.

In a fourth aspect, alone or in combination with one or more of the first through third aspects, a negative acknowledgment of the feedback is located at a resource defined by a time and frequency (time/frequency) resource associated with the plurality of sidelink transmissions.

In a fifth aspect, alone or in combination with one or more of the first through fourth aspects, the indication is transmitted in a sidelink feedback channel with a common NACK corresponding to the plurality of sidelink transmissions, and the indication is transmitted on a number of REs equal to a number of layers on which the at least one sidelink transmission failed.

In a sixth aspect, alone or in combination with one or more of the first through fifth aspects, the number of REs are selected based at least in part on at least one source identifier associated with the at least one sidelink transmission.

In a seventh aspect, alone or in combination with one or more of the first through sixth aspects, the number of REs are selected based at least in part on the number of layers on which the at least one sidelink transmission failed and a maximum number of layers supported by the UE.

In an eighth aspect, alone or in combination with one or more of the first through seventh aspects, the number of REs are selected based at least in part on the number of layers on which the at least one sidelink transmission failed, a maximum number of layers supported by the UE, a time resource associated with the at least one sidelink transmission, and a frequency resource associated with the at least one sidelink transmission.

In a ninth aspect, alone or in combination with one or more of the first through eighth aspects, the indication includes, on each RE of the number of REs, information indicating whether the UE failed to receive a sidelink transmission on a corresponding layer.

In a tenth aspect, alone or in combination with one or more of the first through ninth aspects, the plurality of sidelink transmissions are of a cast type that is not associated with a destination identifier.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
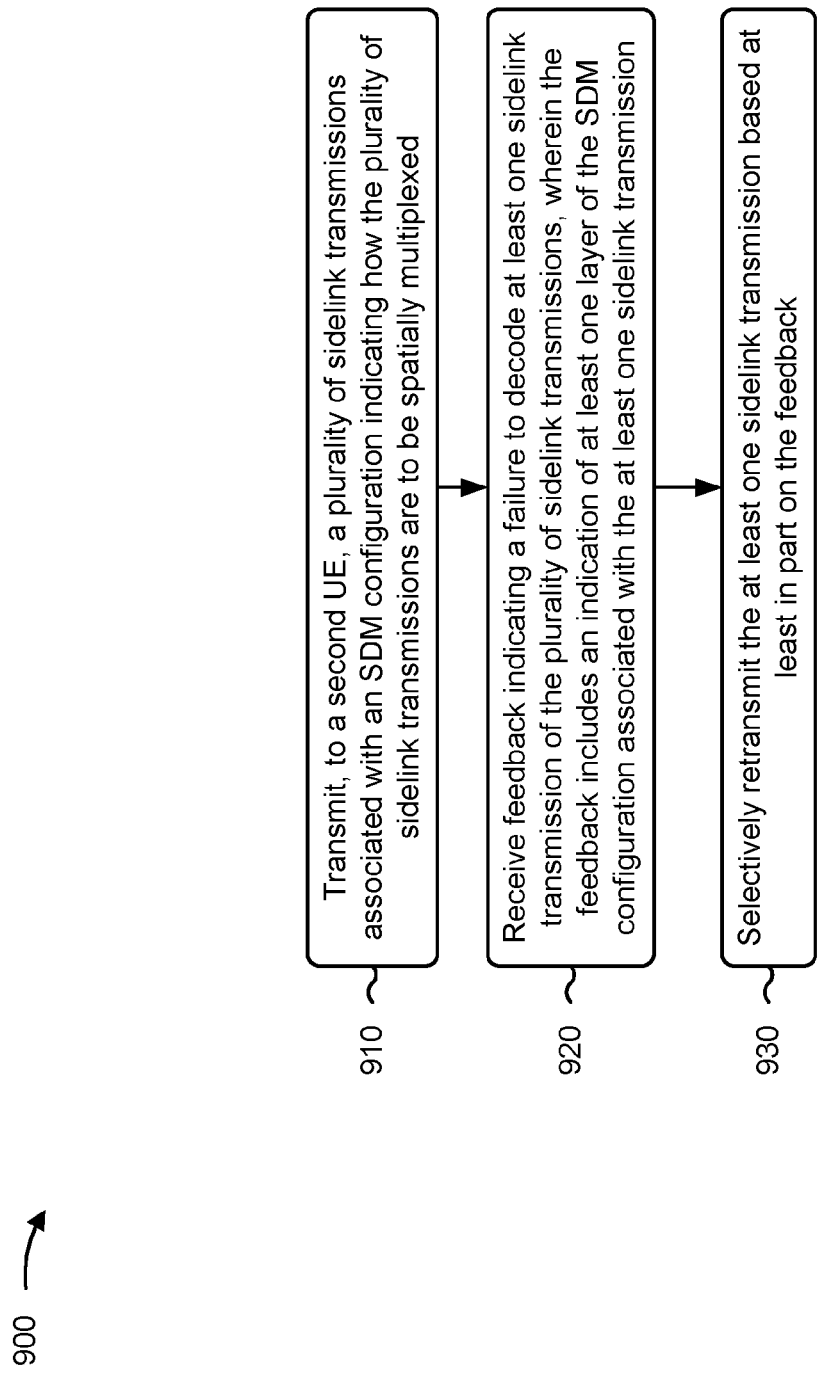

FIG. 9 is a diagram illustrating an example process 900 performed, for example, by a UE, in accordance with various aspects of the present disclosure. Example process 900 is an example where a first UE (e.g., UE 120, UE 305, UE 405/410) performs operations associated with sidelink feedback for multiple transmit-receive points.

As shown in FIG. 9, in some aspects, process 900 may include transmitting, to a second UE, a plurality of sidelink transmissions associated with an SDM configuration indicating how the plurality of sidelink transmissions are to be spatially multiplexed (block 910). For example, the first UE (e.g., using transmission component 1104, depicted in FIG. 11) may transmit, to a second UE, a plurality of sidelink transmissions associated with an SDM configuration indicating how the plurality of sidelink transmissions are to be spatially multiplexed, as described above.

As further shown in FIG. 9, in some aspects, process 900 may include receiving feedback indicating a failure to decode at least one sidelink transmission of the plurality of sidelink transmissions, wherein the feedback includes an indication of at least one layer of the SDM configuration associated with the at least one sidelink transmission (block 920). For example, the UE (e.g., using reception component 1102, depicted in FIG. 11) may receive feedback indicating a failure to decode at least one sidelink transmission of the plurality of sidelink transmissions, wherein the feedback includes an indication of at least one layer of the SDM configuration associated with the at least one sidelink transmission, as described above.

As further shown in FIG. 9, in some aspects, process 900 may include selectively retransmitting the at least one sidelink transmission based at least in part on the feedback (block 930). For example, the UE (e.g., using transmission component 1104, depicted in FIG. 11) may selectively retransmit the at least one sidelink transmission based at least in part on the feedback, as described above.

Process 900 may include additional aspects, such as any single aspect or any combination of aspects described below and/or in connection with one or more other processes described elsewhere herein.

In a first aspect, selectively retransmitting the at least one sidelink transmission based at least in part on the feedback further comprises identifying the at least one layer based at least in part on a set of REs on which the indication is transmitted, identifying a communication to be retransmitted based at least in part on the at least one layer, and retransmitting the communication via the at least one layer.

In a second aspect, alone or in combination with the first aspect, the set of REs are based at least in part on at least one source identifier associated with the first UE.

In a third aspect, alone or in combination with one or more of the first and second aspects, the set of REs are selected based at least in part on a number of layers on which the at least one sidelink transmission failed and a maximum number of layers supported by the second UE.

In a fourth aspect, alone or in combination with one or more of the first through third aspects, the set of REs are selected based at least in part on a number of layers on which the at least one sidelink transmission failed, a maximum number of layers supported by the second UE, a time resource associated with the at least one sidelink transmission, and a frequency resource associated with the at least one sidelink transmission.

In a fifth aspect, alone or in combination with one or more of the first through fourth aspects, the indication includes, on each RE of the set of REs, information indicating whether the second UE failed to receive a sidelink transmission on a corresponding layer.

In a sixth aspect, alone or in combination with one or more of the first through fifth aspects, selectively retransmitting the at least one sidelink transmission based at least in part on the feedback further comprises retransmitting a proper subset of the plurality of sidelink transmissions based at least in part on the feedback including the indication of the at least one layer.

In a seventh aspect, alone or in combination with one or more of the first through sixth aspects, the first UE is a multiple TRP UE, and the plurality of sidelink transmissions are transmitted via respective TRPs of the first 11E.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
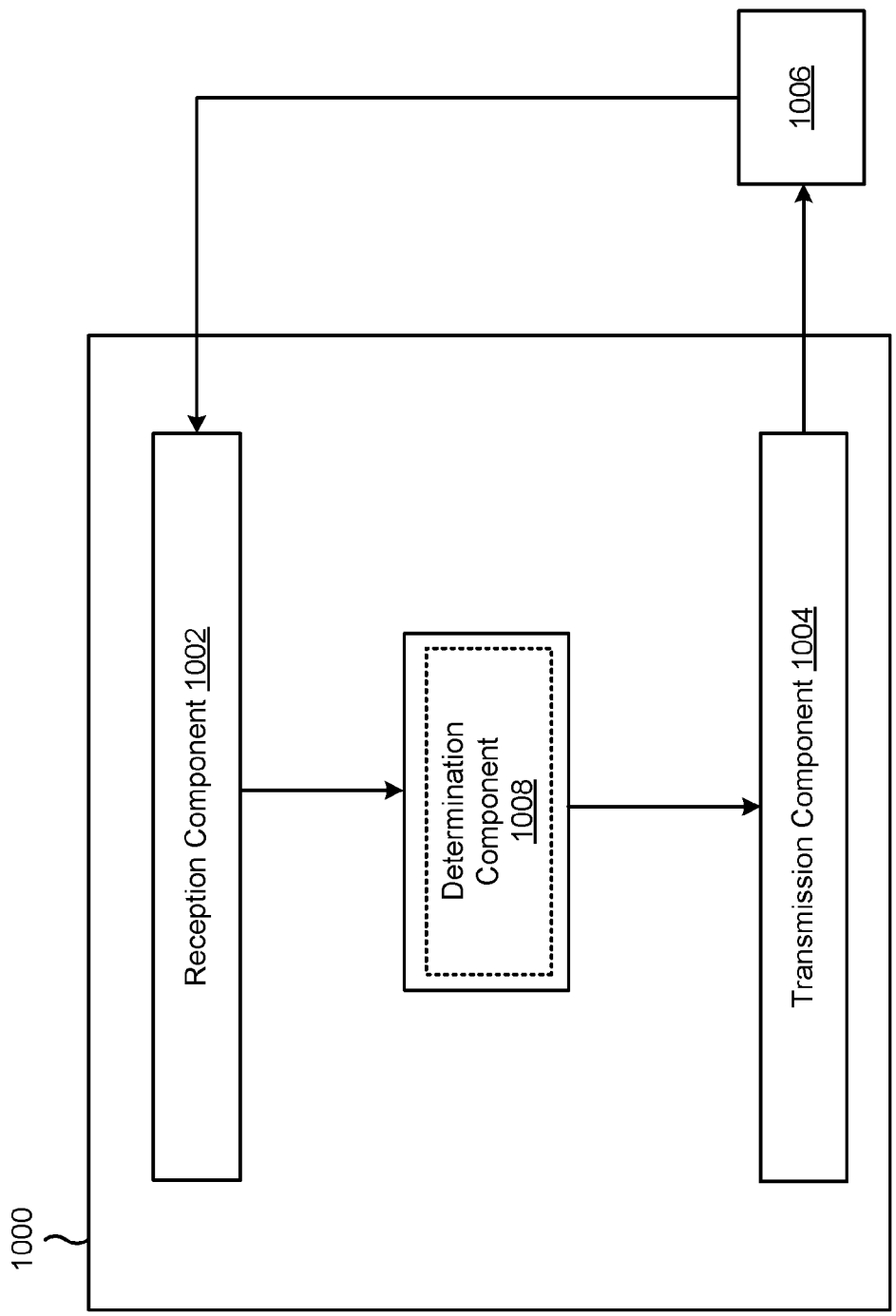

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive a plurality of sidelink transmissions associated with an SDM configuration. The reception component 1002 may fail to decode at least one sidelink transmission of the plurality of sidelink transmissions. The transmission component 1004 may transmit feedback indicating the failure to decode the at least one sidelink transmission, wherein the feedback includes an indication of at least one layer of the SDM configuration associated with the at least one sidelink transmission.

The determination component 1008 may determine whether to provide feedback regarding each sidelink transmission of the plurality of sidelink transmissions based at least in part on whether each sidelink transmission is within a threshold range and whether feedback is enabled for each sidelink transmission.

The determination component 1008 may determine to provide feedback associated with the plurality of sidelink transmissions based at least in part on at least one of a cast type of the plurality of sidelink transmissions, a zone identifier of the plurality of sidelink transmissions, a range requirement of the plurality of sidelink transmissions, or a determination that the plurality of sidelink transmissions are SDM transmissions of a single set of packets.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

FIG. 11 is a block diagram of an example apparatus 1100 for wireless communication. The apparatus 1100 may be a first UE, or a first UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 3-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the first UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the first UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the first UE described above in connection with FIG. 2. In some aspects, the transmission component 1104 may be co-located with the reception component 1102 in a transceiver.

The transmission component 1104 may transmit, to a second UE, a plurality of sidelink transmissions associated with an SDM configuration. The reception component 1102 may receive feedback indicating a failure to decode at least one sidelink transmission of the plurality of sidelink transmissions, wherein the feedback includes an indication of at least one layer of the SDM configuration associated with the at least one sidelink transmission. The transmission component 1104 may selectively retransmit the at least one sidelink transmission based at least in part on the feedback. The determination component 1108 may determine resources for the The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some aspects of the present disclosure:

Aspect 1: A method of wireless communication performed by a user equipment (UE), comprising: receiving a plurality of sidelink transmissions associated with a spatial division multiplexing (SDM) configuration indicating how the plurality of sidelink transmissions are to be spatially multiplexed; failing to decode at least one sidelink transmission of the plurality of sidelink transmissions; and transmitting feedback indicating the failure to decode the at least one sidelink transmission, wherein the feedback includes an indication of at least one layer of the SDM configuration associated with the at least one sidelink transmission.

Aspect 2: The method of aspect 1, wherein the indication is transmitted in a sidelink feedback channel with a common negative acknowledgment (NACK) corresponding to the plurality of sidelink transmissions, and wherein the indication is transmitted on a resource element, of the sidelink feedback channel, that is unused by the common NACK.

Aspect 3: The method of any of aspects 1-2, further comprising: determining whether to provide feedback regarding each sidelink transmission of the plurality of sidelink transmissions based at least in part on whether each sidelink transmission is within a threshold range and whether feedback is enabled for each sidelink transmission.

Aspect 4: The method of any of aspects 1-3, further comprising: determining to provide feedback associated with the plurality of sidelink transmissions based at least in part on at least one of: a cast type of the plurality of sidelink transmissions, a zone identifier of the plurality of sidelink transmissions, a range requirement of the plurality of sidelink transmissions, or a determination that the plurality of sidelink transmissions are SDM transmissions of a single set of packets.

Aspect 5: The method of any of aspects 1-4, wherein a negative acknowledgment of the feedback is located at a resource defined by a time and frequency (time/frequency) resource associated with the plurality of sidelink transmissions.

Aspect 6: The method of any of aspects 1-5, wherein the indication is transmitted in a sidelink feedback channel with a common negative acknowledgment (NACK) corresponding to the plurality of sidelink transmissions, and wherein the indication is transmitted on a number of resource elements (REs) equal to a number of layers on which the at least one sidelink transmission failed.

Aspect 7: The method of aspect 6, wherein the number of REs are selected based at least in part on at least one source identifier associated with the at least one sidelink transmission.

Aspect 8: The method of aspect 6, wherein the number of REs are selected based at least in part on the number of layers on which the at least one sidelink transmission failed and a maximum number of layers supported by the UE.

Aspect 9: The method of aspect 8, wherein the number of REs are selected based at least in part on the number of layers on which the at least one sidelink transmission failed, a maximum number of layers supported by the UE, a time resource associated with the at least one sidelink transmission, and a frequency resource associated with the at least one sidelink transmission.

Aspect 10: The method of aspect 6, wherein the indication includes, on each RE of the number of REs, information indicating whether the UE failed to receive a sidelink transmission on a corresponding layer.

Aspect 11: The method of any of aspects 1-10, wherein the plurality of sidelink transmissions are of a cast type that is not associated with a destination identifier Aspect 12: A method of wireless communication performed by a first user equipment (UE), comprising: transmitting, to a second UE, a plurality of sidelink transmissions associated with a spatial division multiplexing (SDM) configuration indicating how the plurality of sidelink transmissions are to be spatially multiplexed; receiving feedback indicating a failure to decode at least one sidelink transmission of the plurality of sidelink transmissions, wherein the feedback includes an indication of at least one layer of the SDM configuration associated with the at least one sidelink transmission; and selectively retransmitting the at least one sidelink transmission based at least in part on the feedback.

Aspect 13: The method of aspect 12, wherein selectively retransmitting the at least one sidelink transmission based at least in part on the feedback further comprises: identifying the at least one layer based at least in part on a set of resource elements (REs) on which the indication is transmitted; identifying a communication to be retransmitted based at least in part on the at least one layer; and retransmitting the communication via the at least one layer.

Aspect 14: The method of aspect 13, wherein the set of REs are based at least in part on at least one source identifier associated with the first UE.

Aspect 15: The method of aspect 13, wherein the set of REs are selected based at least in part on a number of layers on which the at least one sidelink transmission failed and a maximum number of layers supported by the second UE.

Aspect 16: The method of aspect 15, wherein the set of REs are selected based at least in part on a number of layers on which the at least one sidelink transmission failed, a maximum number of layers supported by the second UE, a time resource associated with the at least one sidelink transmission, and a frequency resource associated with the at least one sidelink transmission.

Aspect 17: The method of aspect 13, wherein the indication includes, on each RE of the set of REs, information indicating whether the second UE failed to receive a sidelink transmission on a corresponding layer.

Aspect 18: The method of any of aspects 12-17, wherein selectively retransmitting the at least one sidelink transmission based at least in part on the feedback further comprises: retransmitting a proper subset of the plurality of sidelink transmissions based at least in part on the feedback including the indication of the at least one layer.

Aspect 19: The method of any of aspects 12-18, wherein the first UE is a multiple transmit-receive point (TRP) UE, and wherein the plurality of sidelink transmissions are transmitted via respective TRPs of the first UE.

Aspect 19: An apparatus for wireless communication at a device, comprising a processor; memory coupled with the processor; and instructions stored in the memory and executable by the processor to cause the apparatus to perform the method of one or more aspects of aspects 1-11.

Aspect 20: A device for wireless communication, comprising a memory and one or more processors coupled to the memory, the memory and the one or more processors configured to perform the method of one or more aspects of aspects 1-11.

Aspect 21: An apparatus for wireless communication, comprising at least one means for performing the method of one or more aspects of aspects 1-11.

Aspect 22: A non-transitory computer-readable medium storing code for wireless communication, the code comprising instructions executable by a processor to perform the method of one or more aspects of aspects 1-11.

Aspect 23: A non-transitory computer-readable medium storing a set of instructions for wireless communication, the set of instructions comprising one or more instructions that, when executed by one or more processors of a device, cause the device to perform the method of one or more aspects of aspects 1-11.

Aspect 24: An apparatus for wireless communication at a device, comprising a processor; memory coupled with the processor; and instructions stored in the memory and executable by the processor to cause the apparatus to perform the method of one or more aspects of aspects 12-19.

Aspect 25: A device for wireless communication, comprising a memory and one or more processors coupled to the memory, the memory and the one or more processors configured to perform the method of one or more aspects of aspects 12-19.

Aspect 26: An apparatus for wireless communication, comprising at least one means for performing the method of one or more aspects of aspects 12-19.

Aspect 27: A non-transitory computer-readable medium storing code for wireless communication, the code comprising instructions executable by a processor to perform the method of one or more aspects of aspects 12-19.

Aspect 28: A non-transitory computer-readable medium storing a set of instructions for wireless communication, the set of instructions comprising one or more instructions that, when executed by one or more processors of a device, cause the device to perform the method of one or more aspects of aspects 12-19.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors operatively coupled to the one or more memories, the one or more memories and the one or more processors configured to:
     receive a plurality of sidelink transmissions associated with a spatial division multiplexing (SDM) configuration indicating how the plurality of sidelink transmissions are to be spatially multiplexed;
     fail to decode at least one sidelink transmission of the plurality of sidelink transmissions; and
     transmit feedback indicating the failure to decode the at least one sidelink transmission, wherein the feedback includes an indication of at least one layer of the SDM configuration associated with the at least one sidelink transmission.

2. The UE of claim 1, wherein the indication is transmitted in a sidelink feedback channel with a common negative acknowledgment (NACK) corresponding to the plurality of sidelink transmissions, and wherein the indication is transmitted on a resource element, of the sidelink feedback channel, that is unused by the common NACK.

3. The UE of claim 1, wherein the plurality of sidelink transmissions are of a cast type that is not associated with a destination identifier.

4. The UE of claim 1, wherein the one or more processors are further configured to:
   determine whether to provide feedback regarding each sidelink transmission of the plurality of sidelink transmissions based at least in part on whether each sidelink transmission is within a threshold range and whether feedback is enabled for each sidelink transmission.

5. The UE of claim 1, wherein the one or more processors are further configured to:
   determine to provide feedback associated with the plurality of sidelink transmissions based at least in part on at least one of:
     a cast type of the plurality of sidelink transmissions,
     a zone identifier of the plurality of sidelink transmissions,
     a range requirement of the plurality of sidelink transmissions, or
     a determination that the plurality of sidelink transmissions are SDM transmissions of a single set of packets.

6. The UE of claim 1, wherein a negative acknowledgment of the feedback is located at a resource defined by a time and frequency (time/frequency) resource associated with the plurality of sidelink transmissions.

7. The UE of claim 1, wherein the indication is transmitted in a sidelink feedback channel with a common negative acknowledgment (NACK) corresponding to the plurality of sidelink transmissions, and wherein the indication is transmitted on a number of resource elements (REs) equal to a number of layers on which the at least one sidelink transmission failed.

8. The UE of claim 7, wherein the number of REs are selected based at least in part on at least one source identifier associated with the at least one sidelink transmission.

9. The UE of claim 7, wherein the number of REs are selected based at least in part on the number of layers on which the at least one sidelink transmission failed and a maximum number of layers supported by the UE.

10. The UE of claim 9, wherein the number of REs are selected based at least in part on the number of layers on which the at least one sidelink transmission failed, a maximum number of layers supported by the UE, a time resource associated with the at least one sidelink transmission, and a frequency resource associated with the at least one sidelink transmission.

11. The UE of claim 7, wherein the indication includes, on each RE of the number of REs, information indicating whether the UE failed to receive a sidelink transmission on a corresponding layer.

12. A first user equipment (UE) for wireless communication, comprising:
one or more memories; and
one or more processors operatively coupled to the one or more memories, the one or more memories and the one or more processors configured to:
transmit, to a second UE, a plurality of sidelink transmissions associated with a spatial division multiplexing (SDM) configuration indicating how the plurality of sidelink transmissions are to be spatially multiplexed;
receive feedback indicating a failure to decode at least one sidelink transmission of the plurality of sidelink transmissions, wherein the feedback includes an indication of at least one layer of the SDM configuration associated with the at least one sidelink transmission; and
selectively retransmit the at least one sidelink transmission based at least in part on the feedback.

13. The first UE of claim 12, wherein the one or more processors, when selectively retransmitting the at least one sidelink transmission based at least in part on the feedback, are configured to:
identify the at least one layer based at least in part on a set of resource elements (REs) on which the indication is transmitted;
identify a communication to be retransmitted based at least in part on the at least one layer; and
retransmit the communication via the at least one layer.

14. The first UE of claim 13, wherein the set of REs are based at least in part on at least one source identifier associated with the first UE.

15. The first UE of claim 13, wherein the set of REs are selected based at least in part on a number of layers on which the at least one sidelink transmission failed and a maximum number of layers supported by the second UE.

16. The first UE of claim 15, wherein the set of REs are selected based at least in part on a number of layers on which the at least one sidelink transmission failed, a maximum number of layers supported by the second UE, a time resource associated with the at least one sidelink transmission, and a frequency resource associated with the at least one sidelink transmission.

17. The first UE of claim 13, wherein the indication includes, on each RE of the set of REs, information indicating whether the second UE failed to receive a sidelink transmission on a corresponding layer.

18. The first UE of claim 12, wherein the one or more processors, when selectively retransmitting the at least one sidelink transmission based at least in part on the feedback, are configured to:
retransmit a proper subset of the plurality of sidelink transmissions based at least in part on the feedback including the indication of the at least one layer.

19. The first UE of claim 12, wherein the first UE is a multiple transmit-receive point (TRP) UE, and wherein the plurality of sidelink transmissions are transmitted via respective TRPs of the first UE.

20. A method of wireless communication performed by a user equipment (UE), comprising:

receiving a plurality of sidelink transmissions associated with a spatial division multiplexing (SDM) configuration indicating how the plurality of sidelink transmissions are to be spatially multiplexed;
failing to decode at least one sidelink transmission of the plurality of sidelink transmissions; and
transmitting feedback indicating the failure to decode the at least one sidelink transmission, wherein the feedback includes an indication of at least one layer of the SDM configuration associated with the at least one sidelink transmission.

21. The method of claim 20, wherein the indication is transmitted in a sidelink feedback channel with a common negative acknowledgment (NACK) corresponding to the plurality of sidelink transmissions, and wherein the indication is transmitted on a resource element, of the sidelink feedback channel, that is unused by the common NACK.

22. The method of claim 20, further comprising:
determining whether to provide feedback regarding each sidelink transmission of the plurality of sidelink transmissions based at least in part on whether each sidelink transmission is within a threshold range and whether feedback is enabled for each sidelink transmission.

23. The method of claim 20, further comprising:
determining to provide feedback associated with the plurality of sidelink transmissions based at least in part on at least one of:
a cast type of the plurality of sidelink transmissions,
a zone identifier of the plurality of sidelink transmissions,
a range requirement of the plurality of sidelink transmissions, or
a determination that the plurality of sidelink transmissions are SDM transmissions of a single set of packets.

24. The method of claim 20, wherein the indication is transmitted in a sidelink feedback channel with a common negative acknowledgment (NACK) corresponding to the plurality of sidelink transmissions, and wherein the indication is transmitted on a number of resource elements (REs) equal to a number of layers on which the at least one sidelink transmission failed.

25. The method of claim 20, wherein the indication includes, on each RE of the number of REs, information indicating whether the UE failed to receive a sidelink transmission on a corresponding layer.

26. A method of wireless communication performed by a first user equipment (UE), comprising:
transmitting, to a second UE, a plurality of sidelink transmissions associated with a spatial division multiplexing (SDM) configuration indicating how the plurality of sidelink transmissions are to be spatially multiplexed;
receiving feedback indicating a failure to decode at least one sidelink transmission of the plurality of sidelink transmissions, wherein the feedback includes an indication of at least one layer of the SDM configuration associated with the at least one sidelink transmission; and
selectively retransmitting the at least one sidelink transmission based at least in part on the feedback.

27. The method of claim 26, wherein selectively retransmitting the at least one sidelink transmission based at least in part on the feedback further comprises:
identifying the at least one layer based at least in part on a set of resource elements (REs) on which the indication is transmitted;

identifying a communication to be retransmitted based at least in part on the at least one layer; and retransmitting the communication via the at least one layer.

28. The method of claim 27, wherein the set of REs are based at least in part on at least one source identifier associated with the first UE.

29. The method of claim 27, wherein the set of REs are selected based at least in part on a number of layers on which the at least one sidelink transmission failed and a maximum number of layers supported by the second UE.

30. The method of claim 26, wherein the first UE is a multiple transmit-receive point (TRP) UE, and wherein the plurality of sidelink transmissions are transmitted via respective TRPs of the first UE.

* * * * *